(12) United States Patent
Hirayama

(10) Patent No.: US 10,880,449 B2
(45) Date of Patent: Dec. 29, 2020

(54) IMAGE READING APPARATUS AND IMAGE READING METHOD

(71) Applicant: SEIKO EPSON CORPORATION, Tokyo (JP)

(72) Inventor: Ryoichi Hirayama, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/812,416

(22) Filed: Mar. 9, 2020

(65) Prior Publication Data

US 2020/0296244 A1   Sep. 17, 2020

(30) Foreign Application Priority Data

Mar. 11, 2019 (JP) ................. 2019-043411

(51) Int. Cl.
*H04N 1/32* (2006.01)
*H04N 1/00* (2006.01)
*G06K 9/62* (2006.01)

(52) U.S. Cl.
CPC ....... *H04N 1/00816* (2013.01); *G06K 9/6202* (2013.01); *H04N 1/00803* (2013.01)

(58) Field of Classification Search
CPC ........... H04N 1/00816; H04N 1/00803; G06K 9/6202

USPC ........................ 358/464, 466, 496
See application file for complete search history.

(56) References Cited

U.S. PATENT DOCUMENTS

2016/0269583 A1* 9/2016 Kamisoyama ....... H04N 1/4095

FOREIGN PATENT DOCUMENTS

JP    2016-116129 A    6/2016

* cited by examiner

*Primary Examiner* — Cheukfan Lee
(74) *Attorney, Agent, or Firm* — Global IP Counselors, LLP

(57) ABSTRACT

An image reading apparatus includes: a transporting unit; a reading unit that reads the document that is transported; a detecting unit that is provided upstream of the reading unit in the transporting direction and outputs a detection value that tells a transmittance of the document; and a control unit that clips image data at a document area by comparing values of pixels constituting a read image data generated by the reading unit with a threshold value for division into the document area and a background area; wherein the control unit performs clipping by using a first threshold value if the transmittance told by the detection value is less than a predetermined value, and the control unit performs clipping by using a second threshold value that is less than the first threshold value if the transmittance told by the detection value is not less than the predetermined value.

4 Claims, 5 Drawing Sheets

IMAGE READING APPARATUS AND IMAGE READING METHOD

The present application is based on, and claims priority from JP Application Ser. No. 2019-043411, filed Mar. 11, 2019, the disclosure of which is hereby incorporated by reference herein in its entirety.

BACKGROUND

1. Technical Field

Embodiments of the present disclosure relate to an image reading apparatus and an image reading method.

2. Related Art

JP-A-2016-116129 discloses a technique for detecting a borderline that is an array of pixels corresponding to a border between a document area and a background area out of an image obtained by reading a document.

In the above publication, border pixels constituting the border are detected by comparing the difference (derivative value) between pixels that are located adjacent to each other in a certain direction with a threshold.

The transmittance of a document differs from material to material. In image data generated as a result of reading a document that has relatively high transmittance by using a scanner, the color of a document area as a whole is close to the color of a background area outside the document area and, therefore, in related art, it is sometimes difficult to clip image data at the document area properly.

SUMMARY

An image reading apparatus according to a certain aspect of the present disclosure includes: a transporting unit that transports a document in a transporting direction; a reading unit that reads the document that is transported; a detecting unit that is provided upstream of the reading unit in the transporting direction and outputs a detection value that tells a transmittance of the document that is transported; and a control unit that performs, by comparing values of pixels constituting read image data generated by reading the document by the reading unit with a threshold value for division into a document area corresponding to the document and a background area outside the document area, clip processing of clipping image data at the document area out of the read image data. The control unit performs the clip processing by using a first threshold value as the threshold value if the transmittance told by the detection value is less than a predetermined value. The control unit performs the clip processing by using a second threshold value that is less than the first threshold value as the threshold value if the transmittance told by the detection value is not less than the predetermined value.

DESCRIPTION OF EXEMPLARY EMBODIMENTS

Embodiments of the present disclosure will now be described with reference to the accompanying drawings. The drawings are just for the purpose of exemplary illustration of the embodiments. Because of their exemplary nature, some drawings may not be consistent with each other and/or some parts may be omitted in the illustration.

1. Apparatus Configuration

Figure 1:
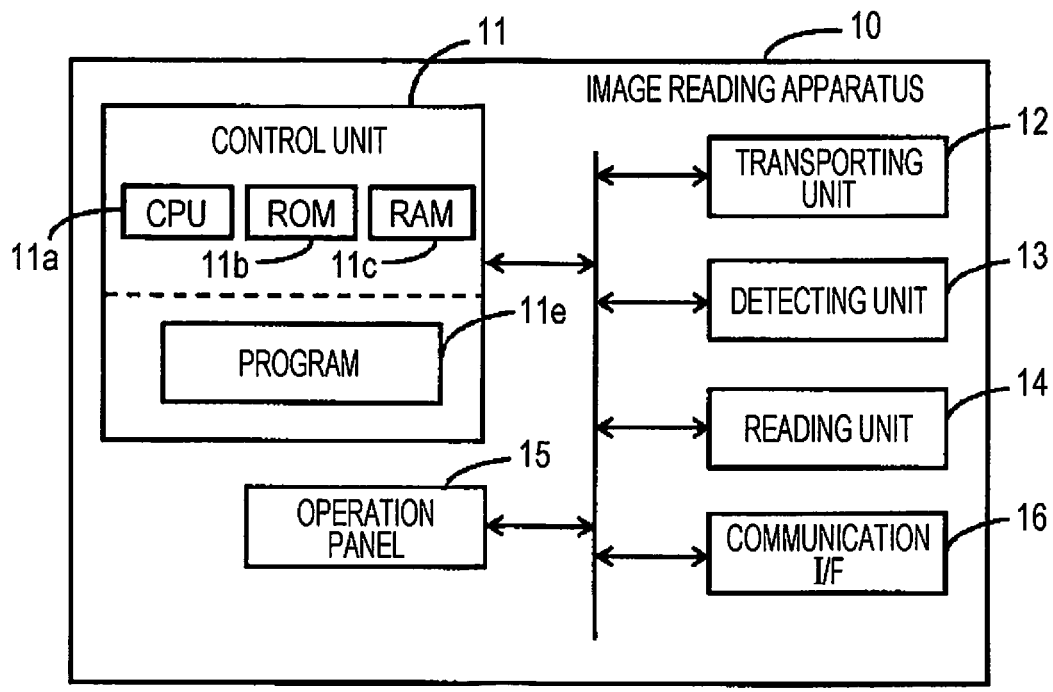
FIG. 1 is a simplified block diagram of the configuration of an image reading apparatus.

FIG. 1 is a simplified view of the configuration of an image reading apparatus 10 according to the present embodiment. The image reading apparatus 10 is a scanner capable of scanning a document. The image reading apparatus 10 includes a control unit 11, a transporting unit 12, a detecting unit 13, a reading unit 14, an operation panel 15, and a communication interface 16. The term "interface" is hereinafter abbreviated as I/F. The control unit 11 includes, for example, a CPU 11a behaving as a processor, memories such as a ROM 11b and a RAM 11c, and the like. The control unit 11 controls the image reading apparatus 10 in accordance with a program lie stored in a memory. The control unit 11 performs image read processing in accordance with the program 11e. An image reading method is disclosed by describing and illustrating image read processing according to the present embodiment. The processor that is a constituent of the control unit 11 is not limited to a single CPU. The processor may include a plurality of CPUs. A hardware circuit such as an application specific integrated circuit (ASIC) may perform the processing. A CPU(s) and a hardware circuit(s) may cooperate with each other to perform the processing.

The transporting unit 12 transports a document from upstream to downstream in "a first direction". The first direction may be referred to as "transporting direction" of a document. The terms "upstream" and "downstream" might be simply used hereinafter for meaning upstream in the first direction and downstream in the first direction. A typical example of a document is paper, but not limited thereto. The document may be a sheet-like medium made of a material that is not paper. Some kinds of object, for example, characters, a photo, an illustration, and the like, are printed on a document. The transporting unit 12 includes a plurality of rollers for transporting a document, a motor that provides motive power to a roller to rotate the roller, and so on.

The reading unit 14 is a mechanism for optically reading a document. The reading unit 14 includes a light source that emits light to a document, an image sensor that outputs an electric charge in accordance with reflected light coming from the document lighted by the light source, an optical system for guiding light to the image sensor, and the like. A document transported by the transporting unit 12 is read by the reading unit 14. Therefore, the image reading apparatus 10 in this example is a sheet feed scanner. At least a part of the transporting unit 12 may be referred to as an automatic sheet feed device or ADF (auto document feeder).

The operation panel 15 includes a display unit for displaying visual information, an operation receiving unit for receiving operations from a user, and the like. The operation receiving unit is a touch panel presented on the display unit, a set of physical buttons, or the like. The communication I/F 16 is a generic collective term of one or more I/Fs for enabling the image reading apparatus 10 to perform wired or wireless communication with an external party in conformity with a predetermined communication protocol including a known telecommunications standard.

The image reading apparatus 10 may be a multi-function printer that has multiple capabilities including functions for printing, facsimile communication, e-mail transmission, and the like, in addition to the functions of a scanner.

Figure 2:
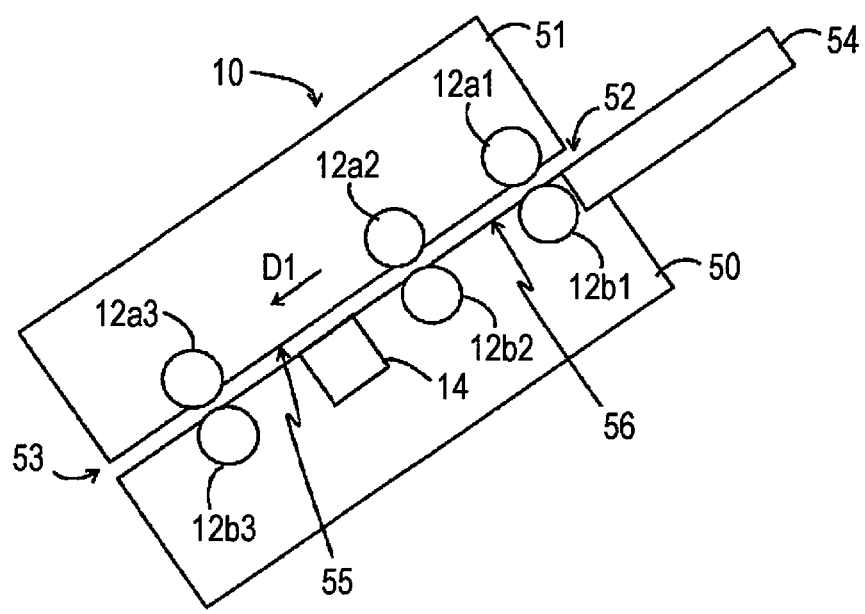
FIG. 2 is a simplified view of a mechanical structure of an image reading apparatus including a transporting path.

FIG. 2 is a simplified view of a mechanical structure of the image reading apparatus 10 including a transporting path 55. As illustrated in FIG. 2, the image reading apparatus 10 includes a body portion 50 and a cover 51. The top surface 56 of the body portion 50 is covered by the cover 51. The cover 51 can be opened from and closed toward the body portion 50. There is the transporting path 55, along which a document is transported by the transporting unit 12, between the body portion 50 and the cover 51. The transporting unit 12 takes in a document from an inlet port 52 on the upstream end of the transporting path 55 to the inside of the housing of the image reading apparatus 10. The transporting unit 12 ejects a document from an outlet port 53 on the downstream end of the transporting path 55 to the outside. The arrow denoted as D1 shows the first direction.

A document placement portion 54, on which a document to be read is placed, is provided near the inlet port 52. The document placement portion 54 extends upstream beyond the inlet port 52. The document placement portion 54 has a size that is large enough to support the entire sheet of, or support almost the entire sheet of, a document having a predetermined size. That is, the document placement portion 54 has a function of extending the top surface 56 of the body portion 50 upstream. The document placement portion 54 may be referred to as a document supporting portion, a document tray, or the like. The document placement portion 54 may be a separate component that is not a part of the body portion 50. Alternatively, the document placement portion 54 may be a part formed integrally with the body portion 50.

The reading unit 14 is provided inside the body portion 50. In the example illustrated in FIG. 2, the reading unit 14 reads a surface of a document transported along the transporting path 55 by the transporting unit 12, specifically, a document surface facing the top surface 56 of the body portion 50. However, the image reading apparatus 10 may be equipped with another reading unit provided at a position where it is possible to read an opposite surface of the document transported along the transporting path 55 by the transporting unit 12, wherein the opposite surface is a surface facing the cover 51. That is, the image reading apparatus 10 may be a double-sided scanner capable of reading the front and back of a sheet of a document simultaneously.

In FIG. 2, three pairs of rollers facing each other on respective sides of the transporting path 55 formed therebetween are illustrated. These rollers constitute a part of the transporting unit 12. A roller pair consisting of a roller 12$a$1 and a roller 12$b$1 is referred to as a first roller pair. A roller pair consisting of a roller 12$a$2 and a roller 12$b$2 is referred to as a second roller pair. A roller pair consisting of a roller 12$a$3 and a roller 12$b$3 is referred to as a third roller pair. The rollers 12$a$1, 12$a$2, and 12$a$3 are provided on the cover 51. The rollers 12$b$1, 12$b$2, and 12$b$3 are provided on the body portion 50. Each roller pair is configured to transport a document by nipping the document between the two rollers constituting the pair and rotating together in a document-nipping state.

The first roller pair (the rollers 12$a$1, 12$b$1), which is located most upstream among the roller pairs illustrated in FIG. 2, is provided slightly downstream of the inlet port 52. A document placed on the document placement portion 54 is transported downstream by the first roller pair.

The document transported by the first roller pair is transported further downstream by the second roller pair (the rollers 12$a$2, 12$b$2), which is located downstream of the first roller pair and upstream of the reading unit 14. The document transported by the second roller pair is read by the reading unit 14 when passing through the position of the reading unit 14 along the transporting path 55.

The third roller pair (the rollers 12$a$3, 12$b$3), which is located most downstream among the roller pairs illustrated in FIG. 2, is provided downstream of the reading unit 14. The document transported by the second roller pair is transported further downstream by the third roller pair and is thereafter ejected from the outlet port 53 to the outside.

Figure 3:
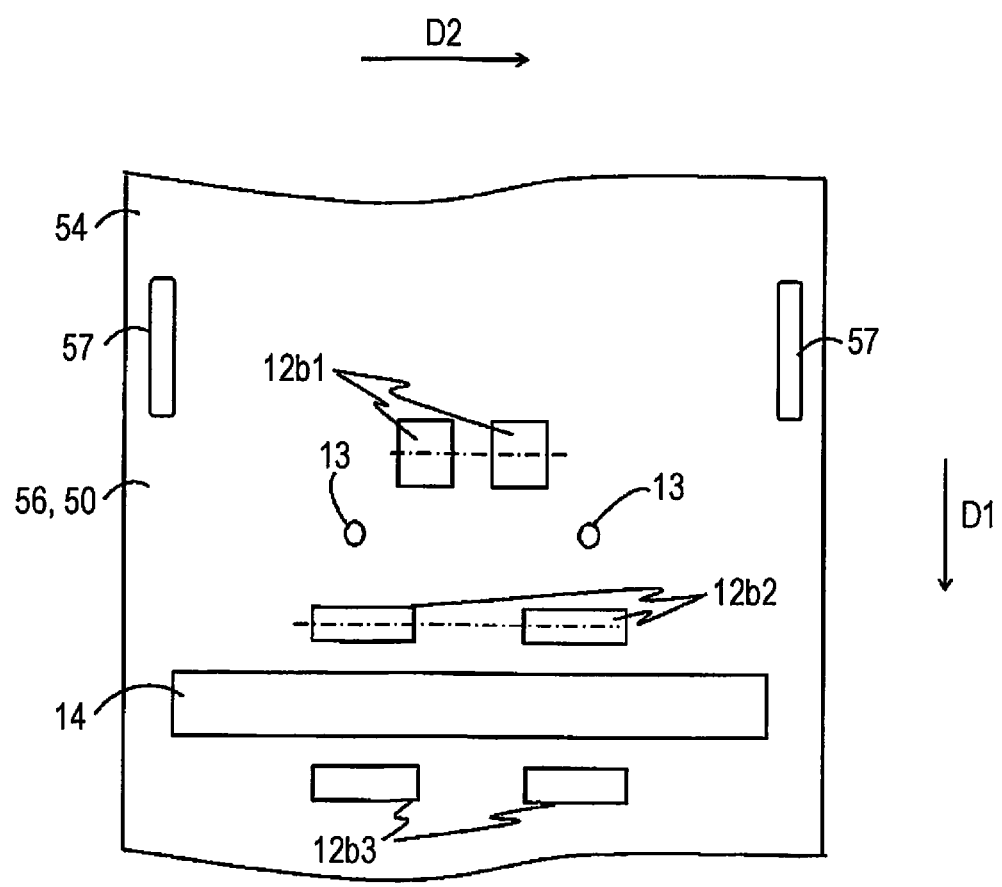
FIG. 3 is a partial view including a part of a body portion and a part of a document placement portion, taken from a viewpoint facing a top surface.

FIG. 3 is a partial view including a part of the body portion 50 and a part of the document placement portion 54, taken from a viewpoint facing the top surface 56. The arrow denoted as D2 shows "a second direction". The second direction D2 may be referred to as the main scan direction of the image sensor that is a constituent of the reading unit 14. Alternatively, the second direction D2 may be referred to as the width direction of a document. The second direction D2 intersects with the first direction D1. The term "intersects" as used herein basically means that they are at right angles to each other. However, exact perpendicularity is not required. The terms "right" and "left" as used herein refer to the right side and the left side in FIG. 3 respectively.

As a matter of course, the rollers 12$b$1, 12$b$2, and 12$b$3 provided in the body portion 50 only are illustrated in FIG. 3, among rollers constituting the first, second, and third roller pairs. In the example illustrated in FIG. 3, each of the rollers 12$b$1, 12$b$2, and 12$b$3 consists of two roller components that are arranged at symmetrical positions with respect to the center of the top surface 56 in the second direction D2. It will be understood from this description that, in the example illustrated in FIG. 3, each of the first, second, and third roller pairs consists of two pairs of roller components.

As illustrated in FIG. 3, the detecting unit 13 is provided in an exposed manner on the top surface 56 of the body portion 50. The detecting unit 13 is a sensor capable of detecting a document that is transported. The detecting unit 13 in this example is an optical sensor. The detecting unit 13 is a reflective-type optical sensor that includes a light transmitting portion and a light receiving portion, though it is simplified in the illustration of FIG. 3. However, the detecting unit 13 may be a transmissive-type optical sensor. If the detecting unit 13 is a transmissive-type optical sensor, a light transmitting portion is provided on one of the body portion 50 and the cover 51, and a light receiving portion is provided on the other thereof. The detecting unit 13 detects a document until the trailing edge of the document passes through the position of the detecting unit 13 after the passing of the leading edge of the document through the position of the detecting unit 13. When in a state of detecting a document, the detecting unit 13 outputs a detection signal the waveform of which is different from the waveform of a detection signal outputted when in a state of not detecting a document. The leading edge of a document is a sheet edge oriented downstream. The trailing edge of a document is a sheet edge oriented upstream.

The detecting unit 13 is located upstream of the reading unit 14. In the example illustrated in FIG. 3, the detecting unit 13 is provided between the nip point of the first roller pair and the nip point of the second roller pair in the first direction D1. The nip point of a roller pair means a point of contact, with a document, of each of two rollers between which the document is nipped. To be exact, contact between a roller and a document is not point contact but linear area contact. However, the term "nip point" is used in the present embodiment. In FIG. 3, the position of the nip point of the roller 12b1 that is a constituent of the first roller pair is indicated by a dot-and-dash line, and the position of the nip point of the roller 12b2 that is a constituent of the second roller pair is indicated by another dot-and-dash line. The detecting unit 13 may be provided at one position upstream of the reading unit 14. Alternatively, the detecting unit 13 may be provided at a plurality of positions distanced in the second direction D2, upstream of the reading unit 14, as in the example illustrated in FIG. 3.

The document placement portion 54 includes edge guides 57 rising therefrom like walls. The edge guides 57 are two wall members that are disposed apart from each other in the second direction D2. The edge guides 57 regulate the position in the second direction D2 of a document placed on the document placement portion 54 from both sides of the document. As widely known, a user is able to change the distance between the edge guides 57 by sliding the edge guides 57 in parallel with the second direction D2. The user adjusts the positions of the edge guides 57 in accordance with the width of a document so that the edge guides 57 will regulate the position of the document from both sides of the document.

2. Image Read Processing

Figure 4:
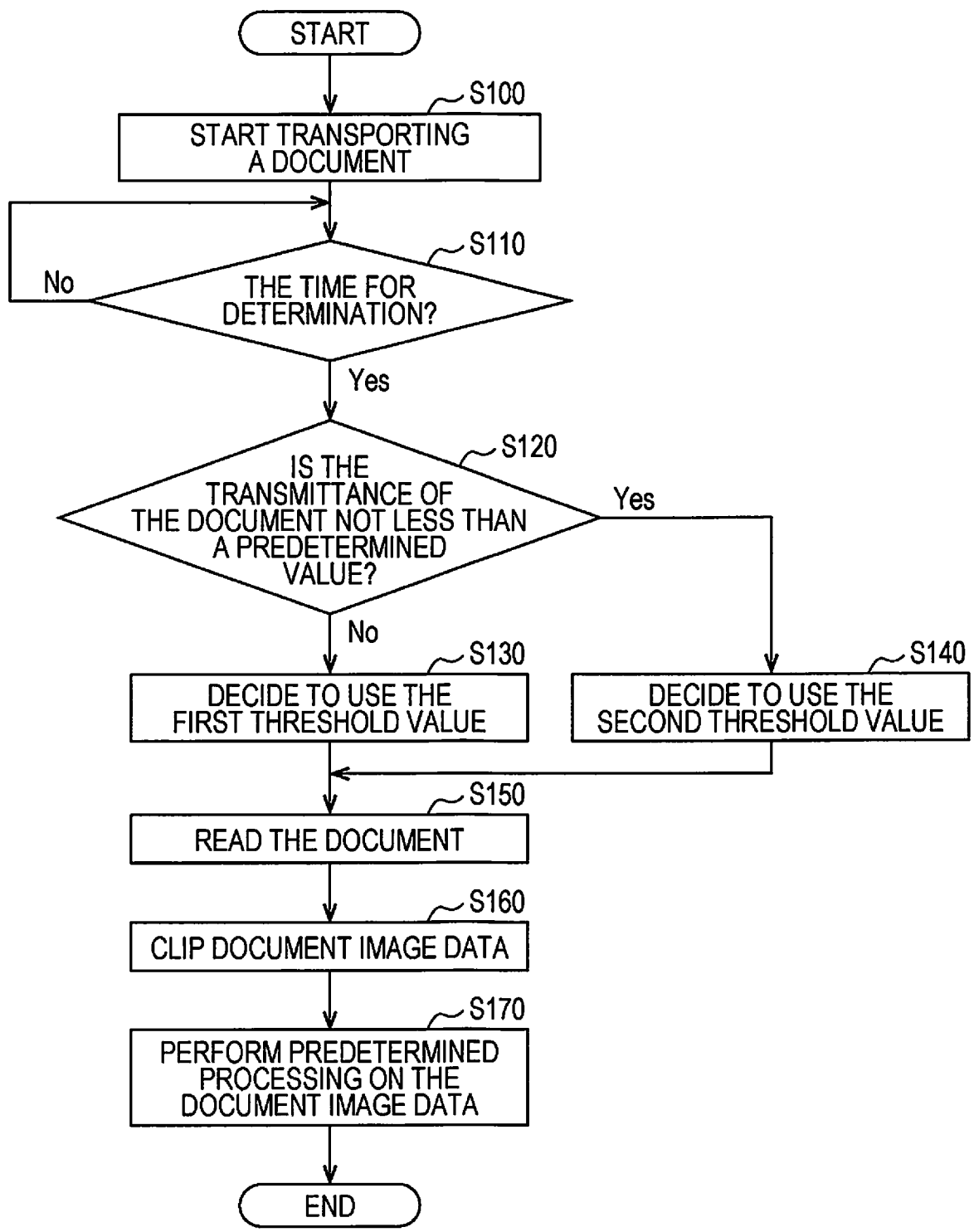
FIG. 4 is a flowchart that illustrates image read processing.

FIG. 4 is a flowchart that illustrates image read processing that is executed by the control unit 11 in accordance with the program 11e.

In response to an instruction to start scanning a document, the control unit 11 controls the transporting unit 12 in order to start the transportation of the document (step S100). The transporting unit 12 starts transporting the document placed on the document placement portion 54. The control unit 11 receives the instruction to start scanning through, for example, an operation of the operation panel 15 by a user or through command transmission from an external computer (not illustrated) connected via the communication I/F 16.

After the start of transporting the document, the control unit 11 performs timing judgment continuously so as to know whether the time for performing determination in step S120 has come or not (step S110). If the time for performing determination in step S120 has come (step S110: Yes), the control unit 11 performs determination in step S120. Specifically, "detecting unit passing time" has been determined in advance, and, when this pre-determined time has elapsed after the start of transporting the document, the control unit 11 determines that the time for performing determination in step S120 has come.

Based on the engineering specifications of the image reading apparatus 10, the distance from the first roller pair (the rollers 12a1, 12b1) to the detecting unit 13 in the first direction D1 is given. In addition, the speed of transporting a document by the transporting unit 12 is also set at some given value. Therefore, it is possible to know in advance, by a calculation, transportation time taken for a document placed on the document placement portion 54 to arrive at the detecting unit 13. The "detecting unit passing time" is a sum of such calculated transportation time and predetermined additional time, and is long enough for the leading edge of a document placed on the document placement portion 54 to pass through the position of the detecting unit 13.

In step S120, based on the value of a detection signal outputted by the detecting unit 13 (detection value) at the timing of determining as "Yes" in step S110, the control unit 11 determines whether the transmittance of the document is not less than a predetermined value. The detection value of the detecting unit 13 tells the transmittance of the document. If the detecting unit 13 is a reflective-type optical sensor as mentioned earlier, the detection value of the detecting unit 13 indicates the degree of reflection of light from the document. Reflectance and transmittance are in a trade-off relationship. Namely, the higher the reflectance is, the lower the transmittance is.

If the detecting unit 13 is a transmissive-type optical sensor, the detection value of the detecting unit 13 indicates the degree of transmission of light through the document. Anyway, the detection value of the detecting unit 13 tells the transmittance of the document, the transportation of which was started by the transporting unit 12 in step S100, either directly or indirectly.

Figure 5:
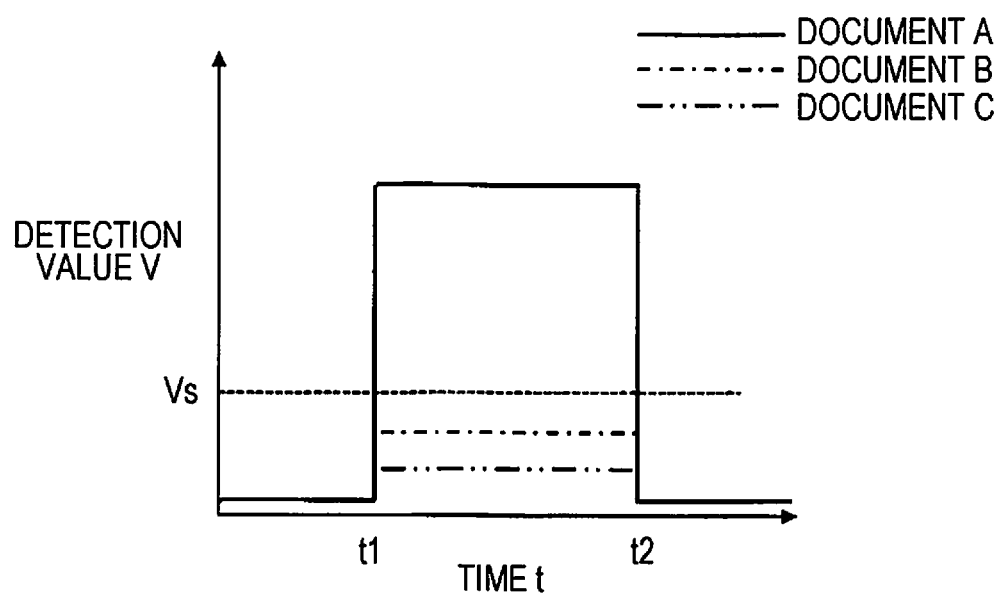
FIG. 5 is a graph that shows an example of the detection value of a detecting unit.

FIG. 5 is a graph that shows changes in the detection value V of the detecting unit 13. For simplicity, it is assumed here that the image reading apparatus 10 has a single detector as the detecting unit 13 and that the detection value V shown in FIG. 5 is an output from the single detector 13. In the explanation of FIG. 5, it is further assumed that the detecting unit 13 outputting the detection value V is a reflective-type optical sensor. Therefore, in FIG. 5, the greater the detection value V is, the lower the transmittance of the document is. In FIG. 5, the horizontal axis of the graph represents time t, and the vertical axis of the graph represents the detection value V. The time t1 is the timing of the passing of the leading edge of a transported document through the position of the detecting unit 13. The time t2 is the timing of the passing of the trailing edge of the document through the position of the detecting unit 13. That is, the transmittance of the document is detected by the detecting unit 13 during the period from the time t1 to the time t2.

The solid line in the graph of FIG. 5 shows the detection value V outputted by the detecting unit 13 when a document A is transported. The one-dot chain (dot-and-dash) line in the graph of FIG. 5 shows the detection value V outputted by the detecting unit 13 when a document B is transported. The two-dot chain line in the graph of FIG. 5 shows the detection value V outputted by the detecting unit 13 when a document C is transported. The document A is a sheet of so-called plain paper. The document B, C is a document made of a transmissive material. Onionskin paper is an example of such a transmissive material of a document. As is clear from FIG. 5, the detection value V corresponding to the document B and the detection value V corresponding to the document C are less than the detection value V corresponding to the document A. Therefore, the transmittance of the document B and the transmittance of the document C are higher than the transmittance of the document A.

A predetermined value Vs is a preset value to be used for determination in step S120. If the detecting unit 13 is a reflective-type optical sensor, the control unit 11 behaves as follows. The control unit 11 compares the detection value V of the detecting unit 13 at the timing of determining as "Yes" in step S110 with the predetermined value Vs. If the detection value V is equal to or less than the predetermined value Vs, the control unit 11 determines that the transmittance of the document is equal to or greater than a predetermined value (step S120: Yes), and the process proceeds to step S140. If the detection value V is greater than the predetermined value Vs, the control unit 11 determines that the transmittance of the document is less than the predetermined value (step S120: No), and the process proceeds to step S130.

In step S130, the control unit 11 decides that a first threshold value should be used for "clip processing" performed in step S160. In step S140, the control unit 11 decides that a second threshold value should be used for "clip processing" performed in step S160. The second threshold value is less than the first threshold value. After step S130 or step S140, the control unit 11 advances the flow to step S150. Both of the first threshold value and the second threshold value are preset values.

In step S150, the control unit 11 controls the reading unit 14 in order to perform the reading of the document. The reading unit 14 performs the reading of the document that is transported by the transporting unit 12 and passes through the position of the reading unit 14. The reading unit 14 generates image data as a result of the reading. The image data generated by reading the document by the reading unit 14 is referred to as "read image data". The reading unit 14 outputs the read image data to the control unit 11.

The read image data that is to be processed in step S160 and a subsequent step by the control unit 11 is, for example, bitmap data in which each pixel has gradation values for RGB (red, green, and value). Each of RGB is expressed in, for example, 256 gradations from 0 to 255. It may be the reading unit 14 that performs processing for converting, into digital data, the read image data generated by reading the document by the reading unit 14 as described above. Alternatively, the control unit 11 may perform this conversion processing.

The processing in step S130 or the processing in step S140 may be performed concurrently with the processing in step S150. It is sufficient as long as the control unit 11 decides, before execution of step S160, which one of the threshold values should be used for clip processing.

In step S160, the control unit 11 performs clip processing, in which image data at a document area is clipped out of the read image data. The image data at a document area is referred to as "document image data". When this processing is performed, the control unit 11 clips the document image data out of the read image data by comparing the values of pixels constituting the read image data with a threshold value for division into a document area corresponding to the document and a background area outside the document area. The threshold value used here is, as a matter of course, either the first threshold value decided in step S130 or the second threshold value decided in step S140.

In the clip processing, first, the control unit 11 performs binarization of the read image data by using a threshold value. For each of the pixels constituting the read image data, the control unit 11 determines whether or not its value falls within "a background color range", the limit of which is defined by the threshold value. For example, the control unit 11 converts the value of a pixel falling within the background color range into "0" and converts the value of a pixel not falling within the background color range into "1". Then, the control unit 11 determines, as the document area, an area whose edges constituting the border are defined by pixels whose values have been converted into "1" by the binarization.

The color of a part of the surface of the cover 51 facing the top surface 56 of the body portion 50 at a region opposite the reading unit 14, with the transporting path 55 formed therebetween, is referred to as a background color. The background color depends on the design specifications of the image reading apparatus 10. For example, the background color is gray. When reading a document, the reading unit 14 reads the background color outside the document, too. The background color range is a preset gradation range corresponding to such a background color.

Figure 6:
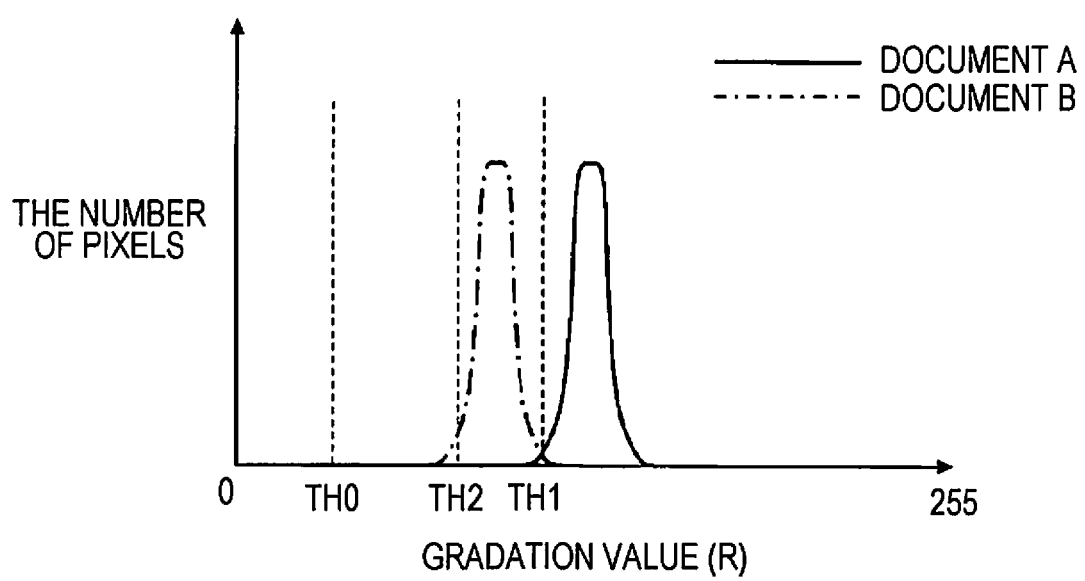
FIG. 6 is a graph that shows an example of the distribution of a color component obtained by reading a document by a reading unit.

FIG. 6 shows an example of a distribution of a color component (color distribution) obtained by reading a document by the reading unit 14. Such a color distribution is referred to also as a histogram. In FIG. 6, the horizontal axis represents gradation values from 0 to 255, and the vertical axis represents the number of pixels. In FIG. 6, a distribution of an R component among R, G, and B components is shown. In FIG. 6, a color distribution indicated by a solid-line curve is an example of the distribution of the R component obtained by reading the document A by the reading unit 14, and a color distribution indicated by a dot-and-dash-line curve is an example of the distribution of the R component obtained by reading the document B by the reading unit 14. Although an object with some color is printed on a document, for simplicity, it is assumed here that the color distribution for the document A, B illustrated in FIG. 6 is a color distribution based on a result of reading the color of the document itself each. In each of the color distribution for the document A and the color distribution for the document B, values representing the number of pixels are concentrated at gradation values corresponding to the color of the document A, B each.

As explained earlier with reference to FIG. 5, the transmittance of the document B is higher than the transmittance of the document A. Therefore, the color distribution obtained as the result of reading the document B by the reading unit 14, which is configured to optically receive light reflected from the document by the image sensor and convert the received light into electric charges, is shifted to a darker side (lower gradation) as a whole, as compared with the color distribution obtained as the result of reading the document A by the reading unit 14. In FIG. 6, a gradation range from a gradation value TH0 to a gradation value TH1 corresponds to the background color range indicating the background color described above (gray). The gradation range from the gradation value TH0 to the gradation value TH1 is referred to also as "normal background color range". The gradation value TH1 corresponds to the first threshold value. That is, the first threshold value is the upper limit of the normal background color range.

The most part of the color distribution for the document A does not fall within the normal background color range (from the gradation value TH0 to the gradation value TH1). Therefore, for the document A that has low transmittance such as plain paper that is ordinarily used, it is proper to set the first threshold value as the upper limit of the background color range. Therefore, in the present embodiment, it is decided in step S130 to use the first threshold value based on the determination result "No" in step S120, and the first threshold value is used as the threshold value in step S160 after proceeding through step S130.

On the other hand, the most part of the color distribution for the document B falls within the normal background color range (from the gradation value TH0 to the gradation value TH1). Therefore, if the first threshold value is used for the binarization of the read image data of the document B, the color of the document B will be recognized as a part of the background color. This makes it impossible to clip the document image data properly. That is, it is impossible to clip image data corresponding to the area of the document B as the document image data when the document B is read by the reading unit 14 actually. To provide a solution to this problem, in the present embodiment, it is decided in step S140 to use the second threshold value based on the determination result "Yes" in step S120, and the second threshold value is used as the threshold value in step S160 after proceeding through step S140.

The gradation value TH2 corresponds to the second threshold value. The relation of TH0<TH2<TH1 holds. That is, by deciding to use the second threshold value, the background color range is changed from the normal background color range (from the gradation value TH0 to the gradation value TH1) to a range from the gradation value TH0 to the gradation value TH2. In the example illustrated in FIG. 6, the most part of the color distribution for the document B does not fall within a background color range defined by the second threshold value (from the gradation value TH0 to the gradation value TH2). Therefore, for the document B that has relatively high transmittance, it is proper to set the second threshold value as the threshold, that is, the upper limit of the background color range.

In the binarization, which is one of processes in the clip processing, for each gradation value of RGB of each pixel that is an element of the read image data, the control unit 11 determines whether or not the value falls within the background color range, the limit of which is defined by the threshold value. Then, for example, if none of gradation values of RGB of a pixel falls within the background color range, the value of this pixel is converted into "1", and if at least one of gradation values of RGB of a pixel falls within the background color range, the value of this pixel is converted into "0". Therefore, each of the first threshold value and the second threshold value has been set in advance correspondingly for each of RGB.

Figure 7:
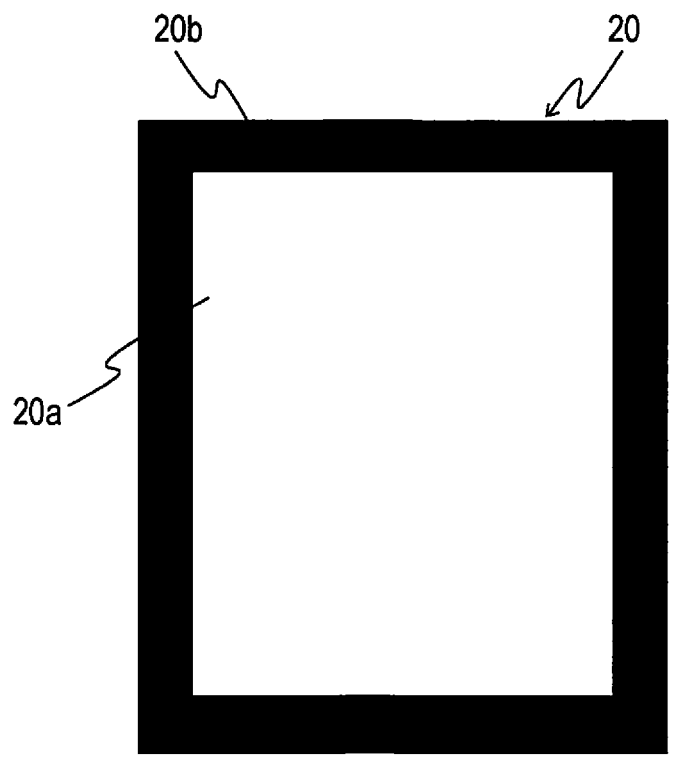
FIG. 7 is a diagram of an example of a document area included in read image data.

FIG. 7 depicts a document area 20*a* included in read image data 20. Specifically, the document area 20*a* is an area whose edges constituting the border are defined by pixels whose values have been converted into "1" by the binarization of the read image data 20. In the read image data 20, the area located outside the document area 20*a* is a background area 20*b*. For example, the values of pixels are scanned sequentially from each of the top edge, the bottom edge, the left edge, and the right edge of the read image data 20 after the binarization toward the center of the read image data 20 in the vertical and horizontal directions. The control unit 11 determines pixels located at positions where the value changes from "0" into "1" as edge pixels. Then, the control unit 11 determines a line formed by connecting these edge pixels in the neighborhood of each of the top edge, the bottom edge, the left edge, and the right edge of the read image data 20. It is possible to determine a rectangular area demarcated by four lines determined in this way as the document area 20*a*.

Data subjected to clipping by the control unit 11 is image data before binarization, needless to mention. Namely, the control unit 11 clips, out of yet-to-be-binarized read image data, image data that is a part corresponding to the document area determined through the binarization described above. The image data clipped in this way is the document image data. Step S160 ends by clipping the document image data out of the read image data. The document image data represents some kinds of object.

In step S170, the control unit 11 performs predetermined processing on the document image data, and the flow illustrated in FIG. 4 ends. Examples of the predetermined processing performed in step S170 are image skew correction processing, color correction processing, and/or lightness correction processing, though not limited to them. The control unit 11 may perform processing of transferring the document image data to an external computer, etc. via the communication I/F 16. The control unit 11 may perform processing for printing the document image data if the image reading apparatus 10 has a printing function in addition to a reading function.

As described above, in the present embodiment, the image reading apparatus 10 includes: the transporting unit 12 that transports a document in a transporting direction (the first direction D1); the reading unit 14 that reads the document that is transported; the detecting unit 13 that is provided upstream of the reading unit 14 in the transporting direction and outputs a detection value that tells a transmittance of the document that is transported; and the control unit 11 that performs, by comparing values of pixels constituting read image data generated by reading the document by the reading unit 14 with a threshold value for division into a document area corresponding to the document and a background area outside the document area, clip processing of clipping image data at the document area out of the read image data. The control unit 11 performs the clip processing by using a first threshold value as the threshold value if the transmittance told by the detection value of the detecting unit 13 is less than a predetermined value, and the control unit 11 performs the clip processing by using a second threshold value that is less than the first threshold value as the threshold value if the transmittance told by the detection value of the detecting unit 13 is not less than the predetermined value.

In the above configuration, the control unit 11 changes the threshold value that is used for the clip processing depending on the transmittance of the document. Therefore, even when the read image data is generated by reading a document that has high transmittance, it is possible to determine the document area accurately and clip the document image data out of the read image data. That is, precision in clipping the document image data improves. Because of improved precision in clipping the document image data, for example, the control unit 11 is able to detect the skew of the document accurately when the document is read by the reading unit 14, and perform image skew correction processing properly.

An image reading method is also disclosed in the present embodiment. The image reading method includes: transporting a document in a transporting direction (the first direction D1) (step S100 and subsequent steps); outputting a detection value that tells a transmittance of the document that is transported; reading the document that is transported (step S150); comparing values of pixels constituting read image data generated by the reading with a threshold value for division into a document area corresponding to the document and a background area outside the document area, thereby clipping image data at the document area out of the read image data (step S160). In the clipping, the image data at the document area is clipped by using a first threshold value as the threshold value if the transmittance told by the detection value is less than a predetermined value, and the image data at the document area is clipped by using a second threshold value that is less than the first threshold value as the threshold value if the transmittance told by the detection value is not less than the predetermined value.

3. Variation Example

Some examples of variations included in the foregoing embodiment will now be explained. The present disclosure encompasses combinations of the foregoing embodiment and at least one variation example and combinations of the variation examples.

Variation Example 1

The control unit 11 may change the second threshold value into a value that is less than the second threshold value depending on the degree of transmission of light if the transmittance told by the detection value outputted by the detecting unit 13 is not less than the predetermined value. That is, the second threshold value may be decreased stepwise depending on the transmittance of the document.

As explained earlier, if the detection value V of the detecting unit 13 is equal to or less than the predetermined value Vs, the control unit 11 determines that the transmittance of the document is equal to or greater than a predetermined value (step S120: Yes), and the process proceeds to step S140. In step S140, for example, the control unit 11 decides that a predetermined second threshold value should be used for the clip processing performed in step S160 if the detection value V is less than the predetermined value Vs but is greater than, or is equal to, a value corresponding to the detection value V of the document B (see the dot-and-dash line in FIG. 5). If the detection value V is less than the value corresponding to the detection value V of the document B (see the dot-and-dash line in FIG. 5), for example, the control unit 11 decides in step S140 that a threshold value that is less than the predetermined second threshold value should be used for the clip processing performed in step S160.

The term "second threshold value" merely means the name of a threshold value that is less than the first threshold value. A plurality of values may be set as the second threshold value. The predetermined second threshold value is a kind of the second threshold value. The threshold value that is less than the predetermined second threshold value is also a kind of the second threshold value. Alternatively, for easier understanding, the predetermined second threshold value may be named as a second threshold value, and the threshold value that is less than the predetermined second threshold value may be named as a third threshold value.

By changing the threshold value into a value that is less than the threshold value depending on the transmittance of the document, the control unit 11 is able to clip the document image data with high precision when various kinds of document that differ in transmittance are read.

Variation Example 2

As described earlier, a plurality of detectors may be provided as the detecting unit 13. In this variation example, the left one of the two detectors 13 illustrated in FIG. 3 is referred to as a first detector 13, and the right one thereof is referred to as a second detector 13. The plurality of detectors 13 outputs a plurality of detection values telling the transmittance at a plurality of positional parts of the document. The plurality of detection values outputted by the plurality of detectors 13 detecting the different positional parts of the document respectively are inputted into the control unit 11. The clip processing may be performed by using the first threshold value if all of values of the transmittance told by the plurality of detection values are less than the predetermined value. The clip processing may be performed by using the second threshold value if at least one of values of the transmittance told by the plurality of detection values is not less than the predetermined value.

Specifically, if the value of the transmittance told by the detection value outputted by the first detector 13 is less than the predetermined value and further if the value of the transmittance told by the detection value outputted by the second detector 13 is less than the predetermined value, the control unit 11 determines as "No" in step S120, and the process proceeds to step S130. If at least one of the value of the transmittance told by the detection value outputted by the first detector 13 and the value of the transmittance told by the detection value outputted by the second detector 13 is not less than the predetermined value, the control unit 11 determines as "Yes" in step S120, and the process proceeds to step S140.

Due to a failure of some of sensors operating as the detecting unit 13, or due to the effect of ink printed on a document, etc., the detection value of the detecting unit 13 detecting a certain positional part of a document might not tell the true transmittance of the document accurately. For example, if the determination in step S120 is performed based on the detection value of a single detector 13 alone, there is a possibility of erroneously determining as if the transmittance of the document were less than the predetermined value, despite the fact that the document has high transmittance, like onionskin paper. By performing the determination in step S120 based on the detection values at the plurality of positional parts of the document by the plurality of detectors 13, it is possible to improve the precision of the determination and use a suitable threshold value corresponding to the actual transmittance of the document. The number of positions where the detectors 13 are provided may be greater than two illustrated in FIG. 3.

What is claimed is:

1. An image reading apparatus, comprising:
    a transporting unit that transports a document in a transporting direction;
    a reading unit that reads the document that is transported;
    a detecting unit that is provided upstream of the reading unit in the transporting direction and outputs a detection value that tells a transmittance of the document that is transported; and
    a control unit that performs, by comparing values of pixels constituting read image data generated by reading the document by the reading unit with a threshold value for division into a document area corresponding to the document and a background area outside the document area, clip processing of clipping image data at the document area out of the read image data; wherein
    the control unit performs the clip processing by using a first threshold value as the threshold value if the transmittance told by the detection value is less than a predetermined value, and
    the control unit performs the clip processing by using a second threshold value that is less than the first threshold value as the threshold value if the transmittance told by the detection value is not less than the predetermined value.

2. The image reading apparatus according to claim 1, wherein
    the detecting unit is provided as a plurality of detectors,
    a plurality of detection values outputted by the plurality of detectors detecting different positional parts of the document respectively are inputted into the control unit, the clip processing is performed by using the first threshold value if all of values of the transmittance told by the plurality of detection values are less than the predetermined value, and the clip processing is performed by using the second threshold value if at least one of values of the transmittance told by the plurality of detection values is not less than the predetermined value.

3. The image reading apparatus according to claim 1, wherein the control unit changes the second threshold value into a value that is less than the second threshold value depending on a degree of the transmittance if the transmittance told by the detection value is not less than the predetermined value.

4. An image reading method, comprising:

a transporting step of transporting a document in a transporting direction;

a detecting step of outputting a detection value that tells a transmittance of the document that is transported;

a reading step of reading the document that is transported;

a clipping step of comparing values of pixels constituting read image data generated in the reading step with a threshold value for division into a document area corresponding to the document and a background area outside the document area, thereby clipping image data at the document area out of the read image data; wherein in the clipping step, the image data at the document area is clipped by using a first threshold value as the threshold value if the transmittance told by the detection value is less than a predetermined value, and the image data at the document area is clipped by using a second threshold value that is less than the first threshold value as the threshold value if the transmittance told by the detection value is not less than the predetermined value.

* * * * *